(12) United States Patent
Yuan

(10) Patent No.: US 9,229,628 B2
(45) Date of Patent: Jan. 5, 2016

(54) METHOD AND APPARATUS FOR REMOTE CONTROL DISTANCE-MEASURING TO GENERATE AN ENGINEERING BLUEPRINT

(71) Applicant: SHENZHEN EVERBEST MACHINERY INDUSTRY CO.,LTD, Shenzhen, Guangdong (CN)

(72) Inventor: Jianmin Yuan, Guangdong (CN)

(73) Assignee: Shenzhen Everbest Machinery Industry Co., Ltd, Shenzhen (CN)

( * ) Notice: Subject to any disclaimer, the term of this patent is extended or adjusted under 35 U.S.C. 154(b) by 273 days.

(21) Appl. No.: 13/811,908

(22) PCT Filed: Sep. 19, 2012

(86) PCT No.: PCT/CN2012/081593
§ 371 (c)(1),
(2) Date: Jan. 24, 2013

(87) PCT Pub. No.: WO2014/032340
PCT Pub. Date: Mar. 6, 2014

(65) Prior Publication Data
US 2014/0195945 A1 Jul. 10, 2014

(30) Foreign Application Priority Data

Aug. 31, 2012 (CN) .......................... 2012 1 0319161
Sep. 14, 2012 (CN) .......................... 2012 1 0341388

(51) Int. Cl.
*G06F 3/048* (2013.01)
*G06F 3/0486* (2013.01)
(Continued)

(52) U.S. Cl.
CPC ............ *G06F 3/0486* (2013.01); *G01C 15/002* (2013.01); *G06Q 50/16* (2013.01); *G08C 17/02* (2013.01); *H04Q 9/00* (2013.01); *H04Q 2209/40* (2013.01)

(58) Field of Classification Search
CPC ..... G06F 3/017; G06F 3/0304; G06F 3/0346; G06F 17/00; G06F 17/40; G06F 17/50
See application file for complete search history.

(56) References Cited

U.S. PATENT DOCUMENTS

| 5,198,868 A | 3/1993 | Saito et al. |
| 5,621,975 A | 4/1997 | Rando |

(Continued)

FOREIGN PATENT DOCUMENTS

| CN | 101169481 | 4/2008 |
| CN | 102121824 | 7/2011 |

(Continued)

OTHER PUBLICATIONS

International Search Report of PCT/CN2012/081593, dated May 9, 2014 (4 pages total).

*Primary Examiner* — Claudia Dragoescu
(74) *Attorney, Agent, or Firm* — Hamre, Schumann, Mueller & Larson, P.C.

(57) ABSTRACT

The present invention relates to a method and an apparatus for remote control distance-measuring to generate an engineering blueprint. The method includes the steps of: building a wireless communication connection between a laser distance-measuring device and a touch sensitive control device; the touch sensitive control device automatically starting an engineering distance-measuring application program; the laser distance-measuring device selecting a required measured element of a measured object; the touch sensitive control device sending a distance-measuring instruction to the laser distance-measuring device, the laser distance-measuring device finishing a distance measurement and synchronously transmitting the measured data to the touch sensitive control device; under a blueprint labeling interface of the touch sensitive control device, finishing blueprint labeling. The apparatus includes a laser distance-measuring device and a touch sensitive control device which builds a wireless communication connection with the laser distance-measuring device. The present invention can reduce labor cost and increase efficiency and quality.

9 Claims, 3 Drawing Sheets

(51) Int. Cl.
  *G01C 15/00*   (2006.01)
  *G06Q 50/16*   (2012.01)
  *G08C 17/02*   (2006.01)
  *H04Q 9/00*    (2006.01)

(56) References Cited

U.S. PATENT DOCUMENTS

| | | |
|---|---|---|
| 6,681,140 B1 * | 1/2004 | Heil ........................ 700/95 |
| 2004/0122628 A1 * | 6/2004 | Laurie ...................... 703/1 |
| 2006/0023199 A1 * | 2/2006 | Stierle et al. ............ 356/4.01 |
| 2008/0174570 A1 * | 7/2008 | Jobs et al. ................ 345/173 |
| 2011/0250870 A1 * | 10/2011 | Silva ..................... 455/412.1 |
| 2013/0271744 A1 * | 10/2013 | Miller et al. ............ 356/4.01 |

FOREIGN PATENT DOCUMENTS

| | | |
|---|---|---|
| CN | 102519429 | 6/2012 |
| CN | 102636788 | 8/2012 |
| CN | 202748025 | 2/2013 |
| CN | 101545770 | 9/2013 |
| JP | 9053937 | 2/1997 |

* cited by examiner

METHOD AND APPARATUS FOR REMOTE CONTROL DISTANCE-MEASURING TO GENERATE AN ENGINEERING BLUEPRINT

The present invention relates to engineering surveying and mapping technology field, and more particularly to a method and an apparatus for remote control distance-measuring to generate an engineering blueprint.

BACKGROUND OF THE INVENTION

The existing field engineering distance-measuring is generally realized by a worker holding tools to measure and record manually, and after finishing measurement, finishing the draw and label of the engineering blueprint by handwork or computer. It has huge work load, boring work content, low efficiency and higher labor cost.

SUMMARY OF THE INVENTION

An object of the present invention is to provide a method and an apparatus for remote control distance-measuring to generate an engineering blueprint for overcoming the defects of the prior art.

To achieve above object, the present invention adopts the following technical solution: a method for remote control distance-measuring to generate an engineering blueprint, the method including the steps of: building a wireless communication connection between a laser distance-measuring device and a touch sensitive control device; the touch sensitive control device automatically starting an engineering distance-measuring application program; the laser distance-measuring device selecting a required measured element of a measured object; the touch sensitive control device sending a distance-measuring instruction to the laser distance-measuring device, the laser distance-measuring device finishing a distance measurement and synchronously transmitting measured data to the touch sensitive control device; under a blueprint labeling interface of the touch sensitive control device, dragging a label symbol of the measured element to a measured element position of a measured object photograph; under the blueprint labeling interface of the touch sensitive control device, dragging the obtained measured data to the label symbol of the measured element.

The laser distance-measuring device builds a wireless communication connection with the touch sensitive control device, the touch sensitive control device displays a measuring interface, the measuring interface includes a field framing measure mode interface and a historical scene framing mode interface; the field framing measure mode interface displays a measured object image; and the historical scene framing mode interface displays a measured object historical photograph.

Under the field framing measure mode interface, the touch sensitive control device takes a measured object photograph and saves it.

The laser distance-measuring device finishes the distance measurement and the measured data synchronously passed back to the touch sensitive control device displays on the measuring interface and blueprint interface of the touch sensitive control device.

The label symbol is generated within the blueprint labeling interface, the label symbol is an arrow head, press and drag the arrow head, arrow body or arrow end to the starting point and finishing point of the measured element of the measured object photograph, simultaneously, drag the measured data of the measured element to the arrow body; wherein it is able to be switched back and forth between the blueprint labeling interface and the measuring interface.

A method for laser distance-measuring to generate an engineering blueprint, the method includes the steps of: building a wireless communication connection between a laser distance-measuring device and a touch sensitive control device; the touch sensitive control device starting an engineering distance-measuring application program; the laser distance-measuring device selecting a required measured element of a measured object; the laser distance-measuring device finishing a distance measurement and synchronously transmitting measured data to the touch sensitive control device; under a blueprint labeling interface of the touch sensitive control device, labeling a label symbol of the measured element and measured data onto a measured element position of a measured object picture.

The laser distance-measuring device builds a wireless communication connection with the touch sensitive control device, the touch sensitive control device displays a measuring interface, the measuring interface comprises a field framing measure mode interface and a historical scene framing mode interface; under the field framing measure mode interface, start a camera to display a measured object image; the historical scene framing mode interface displays a measured object historical photograph; under the field framing measure mode interface, the touch sensitive control device takes a measured object picture and saves it.

The laser distance-measuring device finishes the distance measurement and the measured data synchronously passed back to the touch sensitive control device displays on the measuring interface and blueprint interface of the touch sensitive control device; wherein it is able to be switched back and forth between the blueprint labeling interface and measuring interface.

The laser distance-measuring device finishes the distance measurement after receiving the distance-measuring instruction sent by the touch sensitive control device.

The laser distance-measuring device finishes the distance measurement after a distance-measuring function key provided by the laser distance-measuring device is pressed down.

The labeling of the measured element comprises manual labeling and automatic labeling; the manual labeling is: under the blueprint labeling interface of the touch sensitive control device, drag the label symbol of the measured element to the measured element position of the measured object picture and then drag the obtained measured data onto the label symbol of the measured element; the automatic labeling is: under the blueprint labeling interface of the touch sensitive control device, automatically generate the label symbol with measured data and drag the label symbol to the measured element position of the measured object picture.

An apparatus for remote control distance-measuring to generate an engineering blueprint includes a laser distance-measuring device and a touch sensitive control device; the laser distance-measuring device builds a wireless communication connection with the touch sensitive control device.

The laser distance-measuring device is a laser rangefinder, the laser rangefinder includes a bluetooth, the bluetooth electrically connects with a micro control module of the laser rangefinder; the touch sensitive control device is an iPhone or an iPad.

Compared with the prior art, the present invention has the following beneficial effects: 1) use an engineering distance-measuring application program to realize remote control distance-measuring, and utilize the photograph of measured object to replace manual drawing, thereby reducing labor cost; 2) on-site mapping and simultaneously finishing labeling increases the efficiency and quality of on-site measurement and efficiency of drawing; 3) it is very convenient to amend and improve the engineering drawing, and it is helpful to the budget, quote and construction of the engineering; 4) it is convenient to save and convey the blueprint; 5) it can enhance the pleasure of work.

DETAILED DESCRIPTION OF ILLUSTRATED EMBODIMENTS

For understanding the technical content of the present invention more sufficiently, now combine specific embodiments to introduce and illustrate the technical solution of the present invention as follows.

Figure 1:
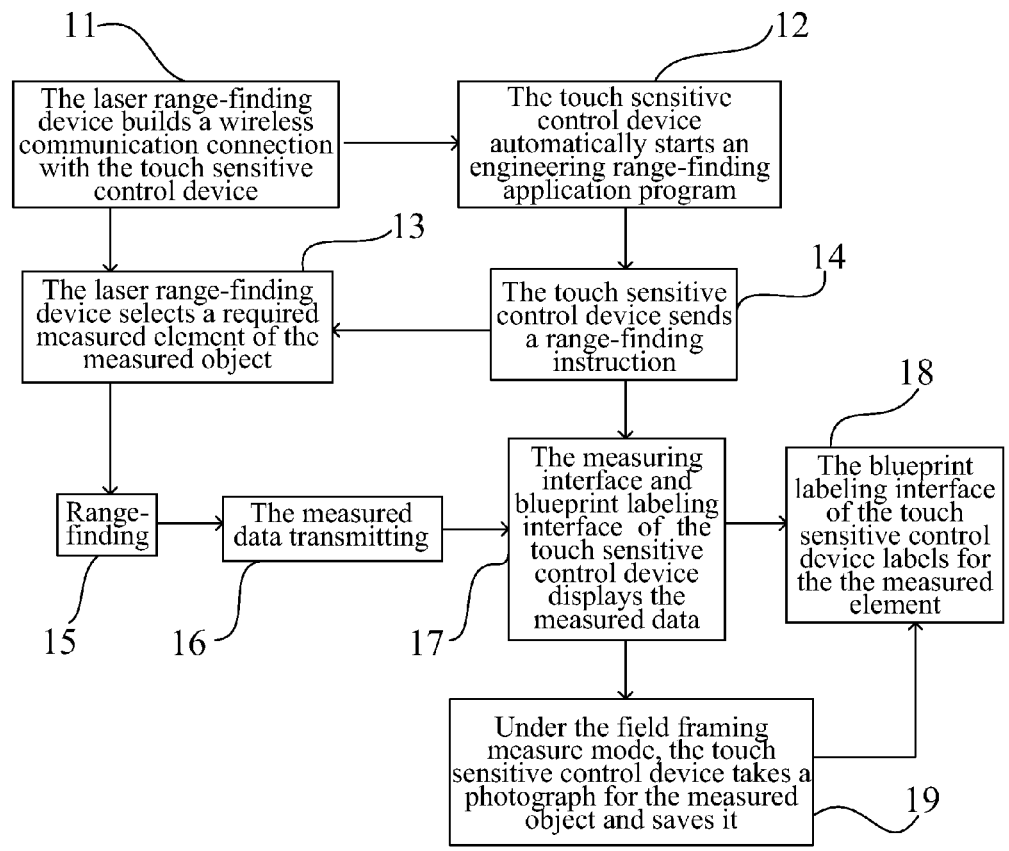
FIG. 1 is a workflow block diagram of a method for remote control distance-measuring to generate an engineering blueprint of the present invention.

As shown in FIG. 1, which is a workflow block diagram of a method for remote control distance-measuring to generate an engineering blueprint of the present invention, the method begins from block 11. Firstly, build a wireless communication connection between a laser distance-measuring device and a touch sensitive control device, after block 11, enter into blocks 12 and 13, hereby, the touch sensitive control device automatically starts an engineering distance-measuring application program; the laser distance-measuring device selects a required measured element of a measured object. Proceed with block 14, the touch sensitive control device sends a distance-measuring instruction to the laser distance-measuring device, the laser distance-measuring device finishes a distance measurement of block 15, proceed with blocks 16 and 17, synchronously transmits the measured data to the touch sensitive control device; after block 17, then enter into block 18, under a blueprint labeling interface of the touch sensitive control device, drag a label symbol of the measured element to a measured element position of a measured object photograph; under the blueprint labeling interface of the touch sensitive control device, drag the obtained measured data to the label symbol of the measured element. By above steps, have finished the labeling of one measured element of the measured object, then repeat above steps of block 13 to block 18 continually, until obtain the measured data and labels of all measured elements of the measured object and finish all the drawing work of the blueprint.

In block 11, after building a wireless communication connection between the laser distance-measuring device and the touch sensitive control device, the measuring interface displayed by the touch sensitive control device includes a field framing measure mode interface and a historical scene framing mode interface; when an engineering worker doing a measure work in a new field scene, due to no existing photographs, need to take a photograph of the measured object for measuring and blueprint labeling in engineering field, under this situation, choose the field framing measure mode interface. When the engineering worker doing a measure work in an existing field scene and the touch sensitive control device has stored the photograph of the measured object, just need to supply certain data or label to the existing measure work, for this, choose the historical scene framing mode interface. The field framing measure mode interface displays a measured object image; and the historical scene framing mode interface displays a measured object historical photograph. Under the field framing measure mode interface, after block 17, then enter into block 19, the touch sensitive control device takes a measured object photograph and saves it, and then enter into block 18 via block 19.

In block 15, 16, 17, the laser distance-measuring device finishes a distance measurement and the measured data synchronously passed back to the touch sensitive control device displays on the measuring interface and blueprint interface of the touch sensitive control device, so as to ensure the synchronism of the laser distance-measuring device and the touch sensitive control device.

In block 18, generate a label symbol within the blueprint labeling interface, the label symbol is an arrow head, press the arrow head, arrow body or arrow end and drag it to the starting point and finishing point of the measured element of the measured object photograph, simultaneously, drag the measured data of the measured element to the arrow body.

In block 17, it is able to be switched back and forth between the blueprint labeling interface and the measuring interface, so that it is convenient to amend, correct and label the measured data.

Figure 3:
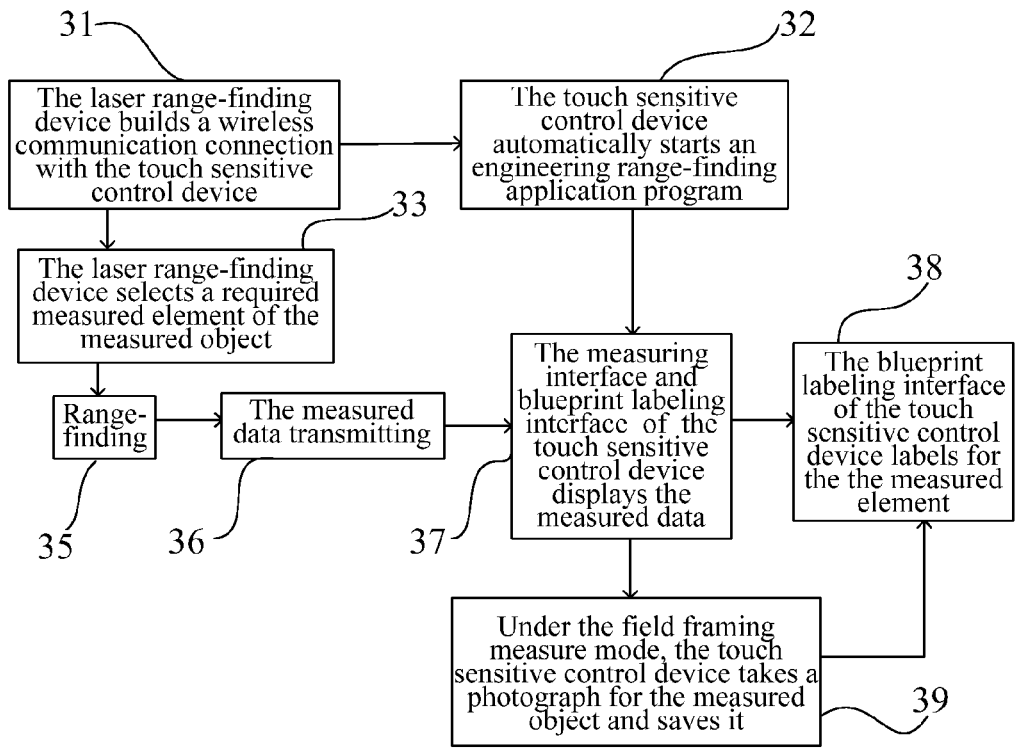
FIG. 3 is a workflow block diagram of a method for laser distance-measuring to generate an engineering blueprint of the present invention.

As shown in FIG. 3, which is a workflow block diagram of a method for laser distance-measuring to generate an engineering blueprint of the present invention, the method begins from block 31. Firstly, build a wireless communication connection between a laser distance-measuring device and a touch sensitive control device, after block 31, enter into blocks 32 and 33, hereby, the touch sensitive control device automatically starts an engineering distance-measuring application program; the laser distance-measuring device selects a required measured element of a measured object. Enter into block 35, the laser distance-measuring device finishes a distance measurement, proceed with blocks 36 and 37, synchronously transmits the measured data to the touch sensitive control device; after block 37, then enter into block 38, under a blueprint labeling interface of the touch sensitive control device, drag a label symbol of the measured element to a measured element position of a measured object picture; under the blueprint labeling interface of the touch sensitive control device, label the label symbol of the measured element and the measured data onto the measured element position of the measured object picture. The measured object picture may be a photograph of the measured object and also may be a engineering electronic drawing. By above steps, have finished the labeling of one measured element of the measured object, then repeat above steps of block 33 to block 38 continually, until obtain the measured data of all measured elements of the measured object and finish all the drawing work of the blueprint.

In block 31, after building a wireless communication connection between the laser distance-measuring device and the touch sensitive control device, the measuring interface displayed by the touch sensitive control device includes a field framing measure mode interface and a historical scene framing mode interface; when an engineering worker doing a measure work in a new field scene, due to no existing pictures, need to take a photograph of the measured object for measuring and blueprint labeling in engineering field, under this situation, choose the field framing measure mode interface. When the engineering worker doing a measure work in an existing field scene and the touch sensitive control device has stored the photograph of the measured object, just need to supply certain data or label to the existing measure work, for this, choose the historical scene framing mode interface. The field framing measure mode interface displays a measured object image; and the historical scene framing mode interface displays a measured object historical photograph. Under the field framing measure mode interface, after block 37, then enter into block 39, the touch sensitive control device takes a measured object photograph and saves it, and then enter into block 38 via block 39.

In block 35, 36, 37, the laser distance-measuring device finishes a distance measurement and the measured data synchronously passed back to the touch sensitive control device displays on the measuring interface and blueprint interface of the touch sensitive control device, so as to ensure the synchronism of the laser distance-measuring device and the touch sensitive control device. In block 37, it is able to be switched back and forth between the blueprint labeling interface and the measuring interface, so that it is convenient to amend, correct and label the measured data.

In block 38, the labeling of the measured element includes manual labeling and automatic labeling; the manual labeling is: under the blueprint labeling interface of the touch sensitive control device, drag the label symbol of the measured element to the measured element position of the measured object picture and then drag the obtained measured data onto the label symbol of the measured element; the automatic labeling is: under the blueprint labeling interface of the touch sensitive control device, automatically generate the label symbol with measured data and drag the label symbol to the measured element position of the measured object picture.

Figure 4:
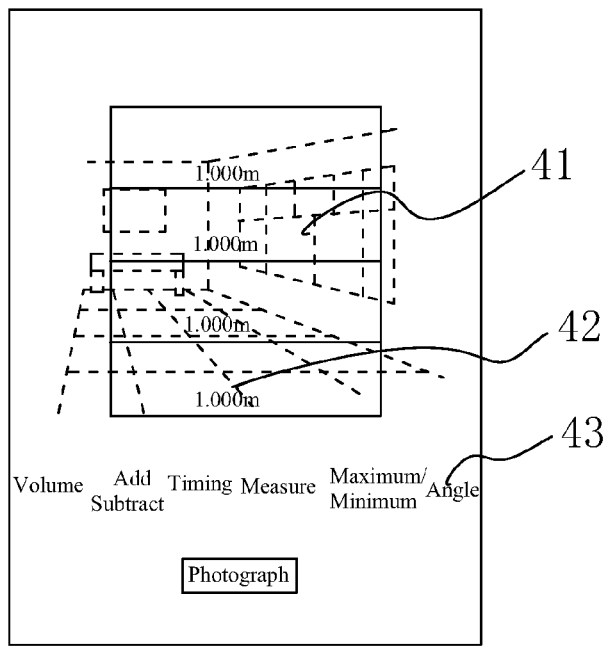
FIG. 4 is a schematic diagram of a measuring interface of a touch sensitive control device of a method for laser distance-measuring to generate an engineering blueprint of the present invention.
Figure 5:
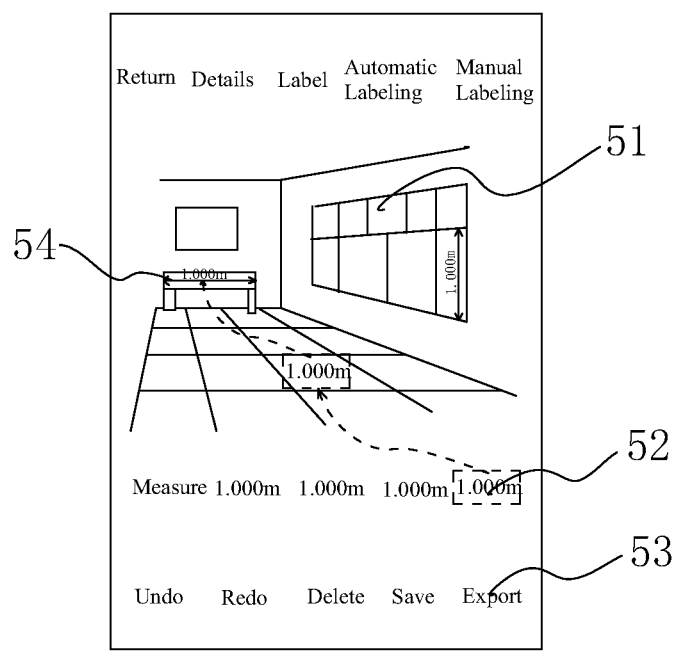
FIG. 5 is a schematic diagram of a blueprint labeling interface of a touch sensitive control device of a method for laser distance-measuring to generate an engineering blueprint of the present invention.

As shown in FIG. 4, which is a schematic diagram of a measuring interface of a touch sensitive control device of a method for laser distance-measuring to generate an engineering blueprint of the present invention, and as shown in FIG. 5, which is a schematic diagram of a blueprint labeling interface of a touch sensitive control device of a method for laser distance-measuring to generate an engineering blueprint of the present invention, the measuring interface of the touch sensitive control device displays historical photographs or images 41 of the measured object, measured data 42 obtained by measuring and icons 43 of various distance-measuring instruction sent by the touch sensitive control device to the laser distance-measuring device; the blueprint labeling interface of the touch sensitive control device displays photographs of the measured object or engineering electronic drawings 51, label symbols 54, measured data 52 and order icons 53 of the blueprint label.

Figure 2:
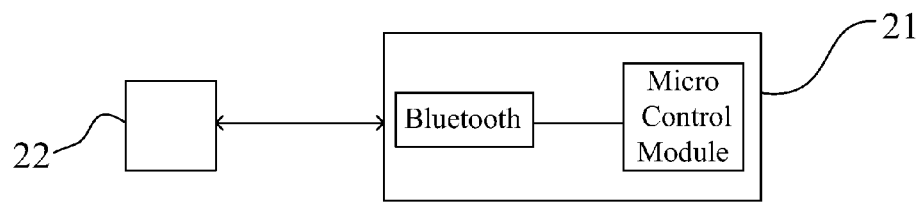
FIG. 2 is a structure schematic diagram of an apparatus for remote control distance-measuring to generate an engineering blueprint of the present invention.

As shown in FIG. 2, which is a structure schematic diagram of an apparatus for remote control distance-measuring to generate an engineering blueprint of the present invention, the apparatus includes a laser distance-measuring device 21 and a touch sensitive control device 22; the laser distance-measuring device 21 builds a wireless communication connection with the touch sensitive control device 22.

Concretely, the laser distance-measuring device 21 is a laser rangefinder, the laser rangefinder 21 includes a bluetooth, and the bluetooth electrically connects with a micro control module of the laser rangefinder.

Concretely, the touch sensitive control device is an iPhone or an iPad.

The laser distance-measuring device builds a wireless communication connection with the iPhone or iPad by the bluetooth in short distance, start the engineering distance-measuring application program installed in the iPhone or iPad for realizing remote control distance-measuring to generate a engineering blueprint.

Above descriptions is provided for further illustrating the technical content of the present invention by embodiments, so as to make the reader understand easily. But it not represent that the mode of execution is just limited to be this, any technique extension and recreation according to the present invention is protected by the present invention.

What is claimed is:

1. A method for remote control distance-measuring to generate an engineering blueprint, the method comprising:
    building a wireless communication connection between a laser distance-measuring device and a touch sensitive control device;
    then, the touch sensitive control device automatically starting an engineering distance-measuring application program and the laser distance-measuring device selecting a required measured element of a measured object, wherein the touch sensitive control device automatically starting the engineering distance-measuring application program and the laser distance-measuring device selecting a required measured element of a measured object are independent from each other;
    the touch sensitive control device sending a distance-measuring instruction to the laser distance-measuring device; and
    the laser distance-measuring device finishing a distance measurement and synchronously transmitting measured data to the touch sensitive control device for displaying on a measuring interface and a blueprint labeling interface of the touch sensitive control device;
    under the blueprint labeling interface of the touch sensitive control device, labeling a label symbol of the measured element generated within the blueprint labeling interface and measured data onto a measured element position of a measured object picture, wherein the labeling of the measured element comprises manual labeling and automatic labeling; the manual labeling is:
    under the blueprint labeling interface of the touch sensitive control device, dragging a label symbol of the measured element generated within the blueprint labeling interface to a measured element position of a measured object photograph;
    under the blueprint labeling interface of the touch sensitive control device, dragging the obtained measured data to the label symbol of the measured element;
    the automatic labeling is: under the blueprint labeling interface of the touch sensitive control device, automatically generating the label symbol with measured data and dragging the label symbol to the position of the measured element of the measured object picture.

2. The method for remote control distance-measuring to generate an engineering blueprint according to claim 1, wherein the laser distance-measuring device builds a wireless communication connection with the touch sensitive control device, the touch sensitive control device displays the measuring interface, the measuring interface comprises a field framing measure mode interface and a historical scene framing mode interface; the field framing measure mode interface displays a measured object image; and the historical scene framing mode interface displays a measured object historical photograph.

3. The method for remote control distance-measuring to generate an engineering blueprint according to claim 2, wherein, under the field framing measure mode interface, the touch sensitive control device takes a measured object photograph and saves it.

4. The method for remote control distance-measuring to generate an engineering blueprint according to claim 3, wherein the label symbol is generated within the blueprint labeling interface, the label symbol is an arrow head, press and drag the arrow head, arrow body or arrow end to the starting point and finishing point of the measured element of the measured object photograph, simultaneously, drag the measured data of the measured element to the arrow body; wherein it is able to be switched back and forth between the blueprint labeling interface and the measuring interface.

5. A method for laser distance-measuring to generate an engineering blueprint, the method comprising:
 building a wireless communication connection between a laser distance-measuring device and a touch sensitive control device;
 then the touch sensitive control device starting an engineering distance-measuring application program and the laser distance-measuring device selecting a required measured element of a measured object, wherein the touch sensitive control device starting the engineering distance-measuring application program and the laser distance-measuring device selecting a required measured element of a measured object are independent from each other; and
 the laser distance-measuring device finishing a distance measurement and synchronously transmitting measured data to the touch sensitive control device displaying on a measuring interface and a blueprint labeling interface of the touch sensitive control device;
 under the blueprint labeling interface of the touch sensitive control device, labeling a label symbol of the measured element generated within the blueprint labeling interface and measured data onto a measured element position of a measured object picture,
 wherein the labeling of the measured element comprises manual labeling and automatic labeling; the manual labeling is: under the blueprint labeling interface of the touch sensitive control device, drag the label symbol of the measured element to the measured element position of the measured object picture and then drag the obtained measured data onto the label symbol of the measured element; the automatic labeling is: under the blueprint labeling interface of the touch sensitive control device, automatically generate the label symbol with measured data and drag the label symbol to the position of the measured element of the measured object picture.

6. The method for laser distance-measuring to generate an engineering blueprint according to claim 5, wherein the laser distance-measuring device builds a wireless communication connection with the touch sensitive control device, the touch sensitive control device displays the measuring interface, the measuring interface comprises a field framing measure mode interface and a historical scene framing mode interface; under the field framing measure mode interface, start a camera to display a measured object image; the historical scene framing mode interface displays a measured object historical photograph; under the field framing measure mode interface, the touch sensitive control device takes a measured object picture and saves it.

7. The method for laser distance-measuring to generate an engineering blueprint according to claim 6, wherein it is able to be switched back and forth between the blueprint labeling interface and measuring interface.

8. The method for laser distance-measuring to generate an engineering blueprint according to claim 7, wherein the laser distance-measuring device finishes the distance measurement after receiving the distance-measuring instruction sent by the touch sensitive control device.

9. The method for laser distance-measuring to generate an engineering blueprint according to claim 7, wherein the laser distance-measuring device finishes the distance measurement after a distance-measuring function key provided by the laser distance-measuring device is pressed down.

* * * * *